(12) United States Patent
Daniel (10) Patent No.: US 9,026,521 B1
(45) Date of Patent: May 5, 2015

(54) SYSTEM AND METHOD FOR CONDUCTING COMPANY SEARCHES AND LEAD GENERATION USING COMPANY CODE INDEX

(76) Inventor: Isaac S. Daniel, Miramar, FL (US)

( * ) Notice: Subject to any disclaimer, the term of this patent is extended or adjusted under 35 U.S.C. 154(b) by 0 days.

(21) Appl. No.: 13/589,015

(22) Filed: Aug. 17, 2012

Related U.S. Application Data (60) Provisional application No. 61/525,262, filed on Aug. 19, 2011.

(51) Int. Cl.
G06F 17/30 (2006.01)
(52) U.S. Cl.
CPC .................. G06F 17/30864 (2013.01)
(58) Field of Classification Search
None
See application file for complete search history.

(56) References Cited

U.S. PATENT DOCUMENTS

| | | | | |
|---|---|---|---|---|
| 7,340,411 | B2 * | 3/2008 | Cook | 705/7.13 |
| 8,630,888 | B2 * | 1/2014 | Seefeld et al. | 705/7.28 |
| 2007/0116238 | A1 * | 5/2007 | Jacobi et al. | 379/265.01 |
| 2008/0187125 | A1 * | 8/2008 | Siegrist | 379/220.01 |
| 2009/0048859 | A1 * | 2/2009 | McCarthy et al. | 705/1 |
| 2010/0131835 | A1 * | 5/2010 | Kumar et al. | 715/205 |
| 2010/0211453 | A1 * | 8/2010 | Huang | 705/14.39 |
| 2011/0258016 | A1 * | 10/2011 | Barak et al. | 705/7.29 |

OTHER PUBLICATIONS

Acronym Creator (http:// acronymcreator. net) (hereafter ACE) Nov. 13, 2008.*

* cited by examiner

*Primary Examiner* — Robert Beausoliel, Jr.
*Assistant Examiner* — Hau H Hoang
(74) *Attorney, Agent, or Firm* — Carol N. Green Kaul, Esq.

(57) ABSTRACT

The various embodiments of systems described herein result from the realization that results from online searches and inquires about companies can be strategically aggregated to report to businesses additional information regarding potential buyers, potential investor's or employee's interests, and/ or whether or not a follow up call is required. The system and method described herein further provide for businesses to register and list their businesses on a company search code index listing whereby each company is assigned a unique company search code index for additional review of the company's profile. In doing so, a user/investor/potential employee can research the company's profile using the search code index and communicate his/her interest in the business through the system and method disclosed herein.

28 Claims, 6 Drawing Sheets

Company's Registration For CSC Index

| Registration Form | | |
|---|---|---|
| Company Name: | ABC Co. | required |
| Company URL: | | required |
| Address 1: | | required |
| Address 2: | | |
| City: | | required |
| State/Province: | | required |
| Zip-Postal Code: | | required |
| Country: | United States | required |
| Phone: | | required |
| Fax: | | |
| Email: | | required |

*120* points to Company Name field; *114* brackets the form.

FIG. 2B

*122* ABC Co. - add your additional information here:

ABC Co., 123 Nowhere, Anytown, USA
XYZ...a, b, c, d, e, f ........ z

SYSTEM AND METHOD FOR CONDUCTING COMPANY SEARCHES AND LEAD GENERATION USING COMPANY CODE INDEX

PRIORITY CLAIM

This patent application is a continuation-in-part non-provisional patent application and claims priority to U.S. Provisional Patent Application Ser. No. 61/454,855, titled "System and Method for Authenticating a User's Authorization to Receive Streamed Content Using a Wireless HDMI Dongle," filed Mar. 21, 2011; U.S Provisional Patent Application Ser. No. 61/467,243, titled "System and Method for Managing and Monitoring Content Distribution and Access," filed Mar. 24, 2011; and U.S. Provisional Application Ser. No. 61/525,262 titled "System And Method For Conducting Company Searches Using Company Code Index" filed Aug. 19, 2011 all of which are hereby incorporated by reference as if fully stated herein.

FIELD OF THE INVENTION

The present disclosure relates generally to electronic systems, apparatuses, and methods, and more particularly, to systems, methods, and various other disclosures related to conducting company searches and lead generation over the Internet using computer generated searchable code index.

BACKGROUND OF THE INVENTION

Many companies advertise on the Internet and pay substantial amounts to optimize searches for their business with the various third-party search engines. Although certain statistical information is reported by the search engines, e.g. numbers of clicks, views, searches, etc., it is well known that the number of hits do not always translate into real business opportunities as there is no comprehensive system or method in place that allows the companies being reviewed to necessarily directly correlate a particular online "inquiry" with the need for feedback or follow-up. Thus, it would be helpful for businesses being reviewed to be informed of potential leads from viable business inquiries based on online searches. It would also be helpful if individuals conducting business research are able to target, e.g. reputable companies, for a follow-up review based on an online inquiry.

Notwithstanding the obvious need for businesses and prospective customers to connect with each other, companies are restricted in their marketing efforts, e.g. "do not call" legislation prohibits companies from telemarketing. Additionally, companies desire to maximize their leads and to reserve their prospecting efforts for those individuals or corporate entities that have a viable potential for doing business. Much of the lead generation tools that currently exist in the prior art determine value prospects based on data mining techniques of user's searches and/or purchasing habits. However, the current lead generation tools do not have the ability to refine the process to determine the seriousness of the prospective customer for doing business. The system and methods described herein satisfies these long felt needs in a new and novel manner.

SUMMARY OF THE INVENTION

The various embodiments of systems described herein result from the realization that results from online searches and inquires about companies can be strategically aggregated to report additional information regarding potential buyers', investors' or employees' interests, and/or whether or not a follow up call is required. The system and methods described herein further provide for the registration and listing of companies on a searchable index listing whereby each company is assigned a unique company search code index displayable on at least one third-party search engine for additional review of the company's profile and/or searches. In doing so, an individual, purchaser, investor or potential employee can research the company's profile using the searchable code index and communicate his/her interest in the business through the system and method disclosed herein.

The system and method for conducting searches and lead generation comprises of: at least one server; an index code database in electronic communication with the at least one server; a search index module comprising of computer executable instruction code executable by at least one processor; and the at least one processor comprising of computer executable instruction code executable by the at least one processor and operative to perform any one or more of the following: activate the search index module to receive the at least one company's registration information to be displayed as a searchable code index on an index listing; convert a name of the least one company to the searchable code index; interface with at least one third-party search engine to receive the at least one third party's search engine's request and simultaneously search the index code database using the third-party search engine's search request to retrieve electronically, results comprising of one or a plurality of companies previously registered with the index code database identifiable as being responsive to the third-party search engine's search request; display simultaneously with the third-party engine's search results, the results of the index code database search as an index listing comprising of the at least one or more searchable code indexes based on prior registration information obtained from companies previously registered with the index code database; and determine the level of review of the at least one company's profile and generate a lead generation form to include a key indicative of the type of lead.

The computer executable instructions are further operative to determine at least one eligibility condition for registerability of the at least one company; retrieve the at least one company profile from the electronic index code database for display as a searchable code index; and to transmit the completed lead generation form with the key indicative of the type of lead to the server so that it can be published to the company whose company profile was reviewed.

In some embodiments, the computer executable instructions executable by the at least one processor are further operative to perform any one or more of the following: determine the length of time spent reviewing the company's profile during a review session; determine the number of additional related searches based on keywords within the company's profile; or determine the number of key strokes during a review session. Searchable code index comprises of any one or more of the following: company's initials, company designated searchable code index, or a random code generated searchable code index. As referenced herein, the at least one eligibility condition is selected from the group consisting of: third-party business rating; verifiable corporate registration and age of company, verifiable internet protocol address, and verifiable company URLs.

The type of lead is based on the level of review which measures any one or more of the following variables: time spent reviewing company's profile, number of additional related searches, and number of key strokes during review session. Once the level of review is determined the lead generation form automatically incorporates a key indicative of any one of the following leads: hot, warm or cold.

In some embodiments, the computer executable instructions are further operative to perform any one or more of the following: allow or refuse registration of the at least one company based on whether authorization is received from the server; or publish the lead generation form to the corresponding company whose profile was reviewed Inndex listing is displayed simultaneously with third party search results as either a column or a row.

Accordingly, the various embodiments and disclosures described herein solve the limitations of the prior art in a new and novel manner.

DETAILED DESCRIPTION OF PREFERRED EMBODIMENTS

Figure 1:
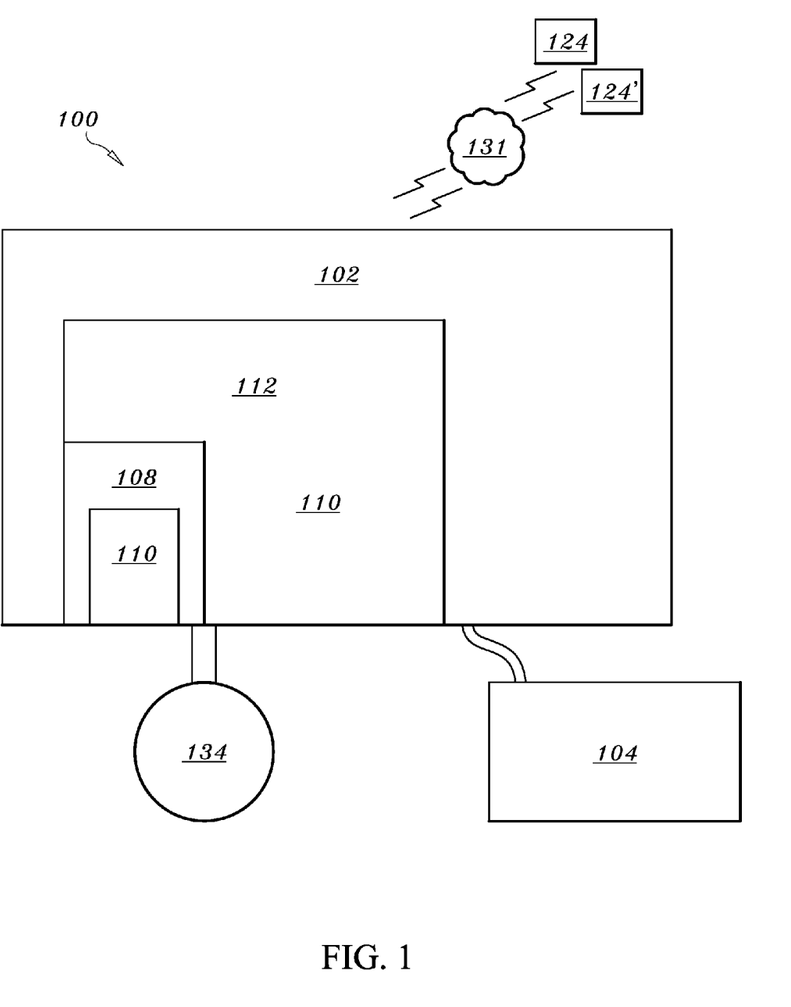
FIG. 1 shows a system in accordance with one embodiment.
Figure 2A:
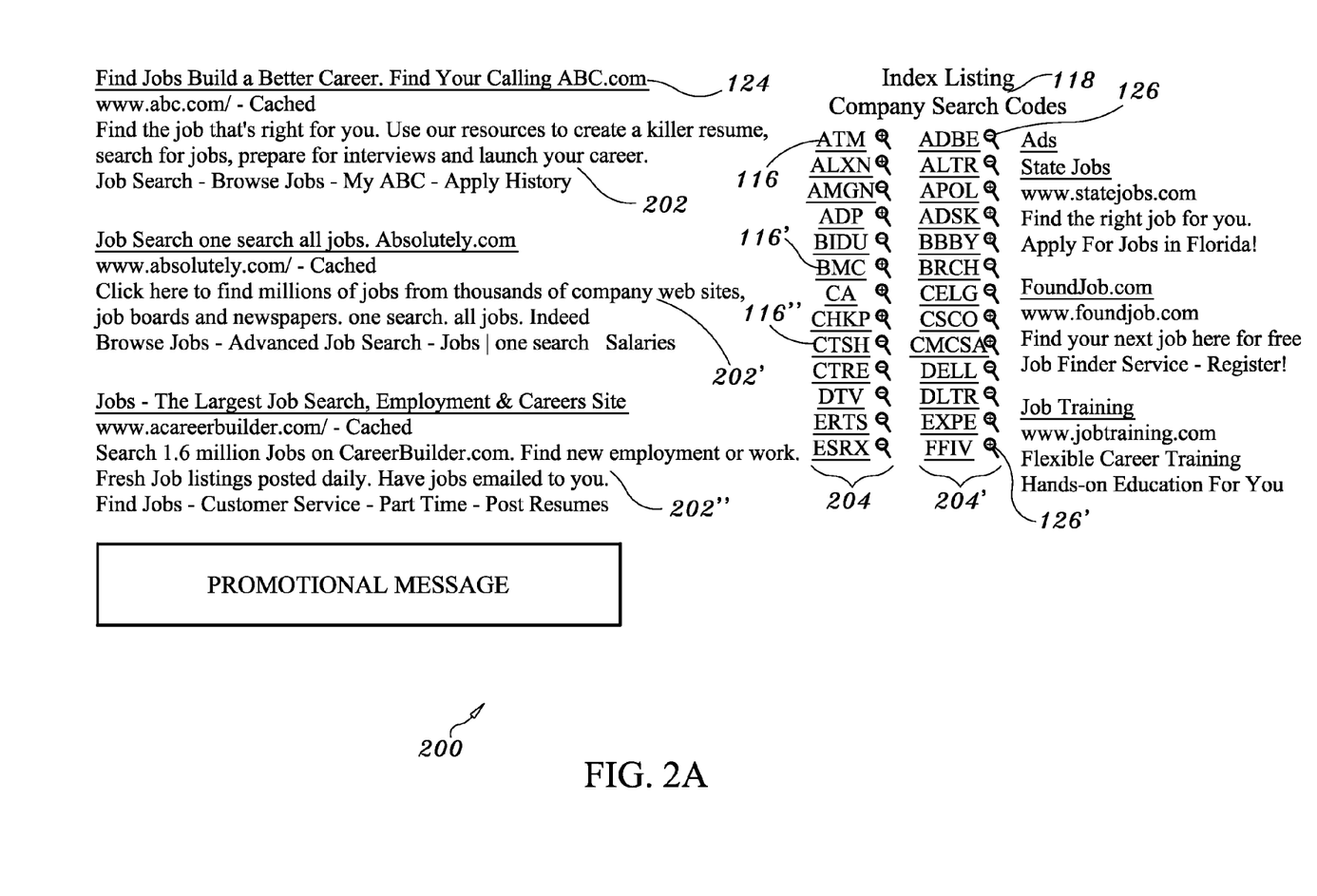
FIG. 2A-2D shows a system in accordance with one embodiment.
Figure 2B:
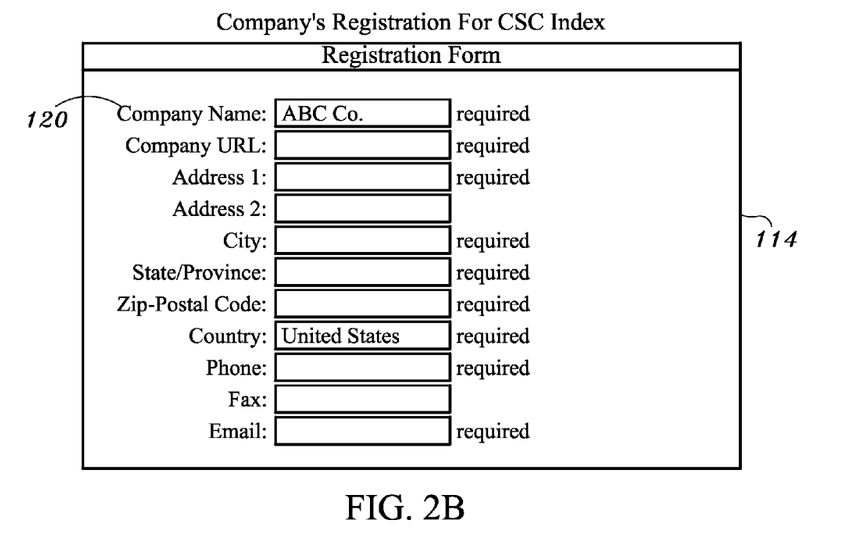
Figure 2C:
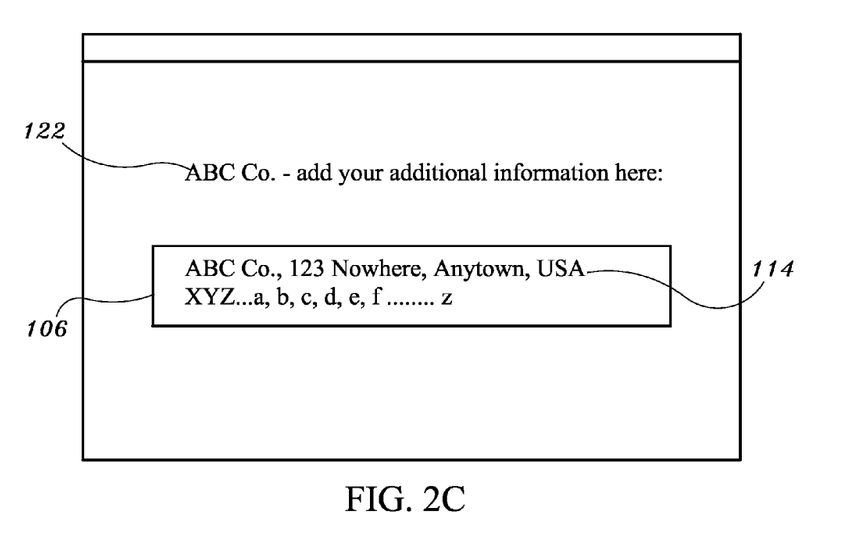
Figure 2D:
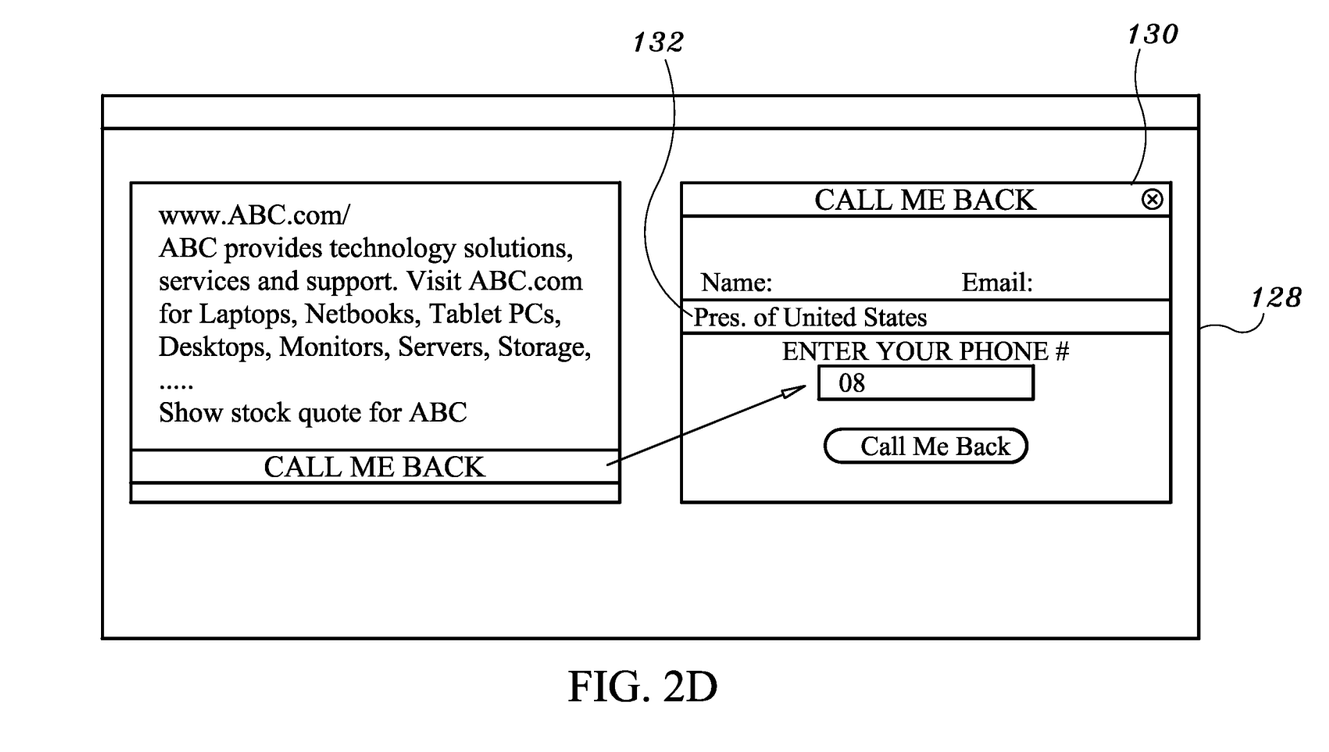

FIGS. 1-2D show a system 100 in accordance with one embodiment of the invention. The system 100 for conducting searches and lead generation comprises of: at least one server 102; an electronic index code database 104, in electronic communication with the at least one server 102 that is configured for storing at least one participating company's profile 106 thereon; a search index module 108 comprising computer executable instruction code 110 executable by at least one processor 112 that is in electronic communication with the at least one server 102; and the at least one processor 112 comprising computer executable instruction code 110 executable by the at least one processor 112 and operative to perform any one or more of the following: activate the search index module 108 to receive the at least one company's registration information 114 to be displayed as a searchable code index 116 on an index listing 118; convert a name 120 of the at least one company 122 to the searchable code index 116; determine at least one of one or more eligibility conditions for registerability of the at least one company 122 by the search index module 108 and/or the at least one processor 112; interface with the at least one third-party search engine 124; receive a third-party search engine search request and simultaneously search the index code database 104 and return at least one company's searchable code index 116 responsive to the third-party search request; display an index listing 118, which includes the at least one searchable code index 116 for receiving search request of the registered companies profiles 106, 106' via clickable search icons 126, 126'; retrieve the participating at least one company's profile 106 from the electronic index code database 104 for display as a searchable code index 116; determine the level of review of the at least one company's profile 106; and generate an electronic lead generation form 128 to include a key 130 indicative of the type of lead based on the level of review of the company's profile 106 or the receipt of at least one individual's contact information 132, e.g. for follow up. The key 130 is indicative of any one of the following leads: hot, warm or cold. As used herein, "third-party search engine" 124 refers to application programs designed to search information on the world wide web, i.e. the Internet with displayable results as web pages, images, other information and the like. Exemplary third-party search engines 124, 124' include but are not limited to YAHOO, BING, GOOGLE and the like.

Server 102 may be any kind of server, such as a content management server, a computer sever, a content delivery network server, a DRM server, a search index server, and the like. Server 102 may be a remote server and may be connected to the electronic index code database 104 and/or the at least one processor 112 via a network 131, such as the Internet.

System 100 also includes an electronic index code database 104 as are well known and used in the arts, configured for storing inter alia index listing 118, at least one company's registration information 114, at least one company's profile 106, and searchable code indexes 116, 116 for the registered companies 122, 122' thereon. Company's profile 106 may include company registration information 114, e.g. name, company's URL, address, email, state and year of incorporation, as well as any other pertinent company information such as contact information for the board of directors, description of goods and/or services offered, product rolls outs, product roll out dates and times, market opportunities, job openings, and or any other relevant company information deemed important for public disclosure.

In some embodiments, search index module 108 may comprise of a software aspect, such as a computer program that comprises of computer executable instruction code 110, a hardware aspect, such as an integrated hardware module or discrete hardware module, or a combination of hardware and software aspects. In some embodiments, search index module 108 may be a dongle, including, but not limited to a USB dongle or an HDMI dongle, and may be powered via a USB, HDMI, or external power supply. Computer executable instruction code 110 may be any type of computer executable instruction code 110, which may be in the form of a computer program, the program being composed in any suitable programming language or source code, such as C++, C, JAVA, JavaScript, HTML, XML, and other programming languages.

Search index module 108 may be a software module or a hardware module and is configured to receive at least one participating company's registration information 114, wherein the at least one company's name 120 is converted to a unique searchable code index 116 to be displayed on an index listing 118 via a clickable search icon 126. Search index module 108 also authenticates company's registration information 114 and may be used to communicate relevant information to the server 102 for compiling statistical information for reporting or advertising purposes, registration information 114 for fee collection purposes, pirated content tracking purposes, user experience customization services, collect subscriber information, e.g. subscriber demographics, geographic location, and the like. In some embodiments, search index module 108 may contain a unique subscriber identification module, wherein said module may be a software module or a hardware module, which may be used in the registration authentication process.

System 100 also includes at least one processor 112 in electronic communication with the at least one server 102. Processor 112 may be any type of processor, such as, but not limited to, a central processing unit (CPU), a microprocessor, a video processor, a front end processor, a coprocessor, a single-core processor, a multi-core processor, and the like.

Processor 112 also includes computer executable instruction code 110, where the computer executable instruction code 110 are operative to perform all the necessary functions for the system 100 and methods disclosed herein. Computer executable instruction code 110 may be loaded directly on the server's processor 112, or its storage means 134.

Storage means 134 may comprise of a storage device and may include memory, such as, but is not limited to, read-only memory, such as CD-ROMs, DVDs, floppy disks, and the like, read and write memory, such as a hard drive, floppy disc, CD-R, CD-RW, DVD-ROM, DVD-R, DVD-RW, solid state memory, such as solid state hard drives, flash memory, and the like, and random access memory. Storage means 134 may be used to store information, such as index code database 104, which may store the index listing 118, company's registration information 114, company's profile 106, internet protocol addresses, eligibility conditions, search results and the like.

Computer executable instruction code 110 is operative to perform any one or more of the following: activate the search index module 108 to receive the at least one company's registration information 114 to be displayed as a searchable code index 116 on an index listing 118; convert a name 120 of the at least one company 122 to the searchable code index 116; determine at least one of one or more eligibility conditions for registerability of the at least one company 122 by the search index module 108 and/or the at least one processor 112; interface with at least one third-party search engine 124 to receive the at least one third party's search engine's request and simultaneously search the index code database 104 using the third-party search engine's search request to retrieve electronically, results comprising of one or a plurality of companies 122, 122 previously registered with the index code database 104 identifiable as being responsive to the third-party search engine's search request; display simultaneously with the third-party engine's search results, the results of the index code database search as an index listing 118 comprising of the at least one or more searchable code indexes 116, 116' based on prior registration information obtained from companies 122, 122' previously registered with the index code database 104; and determine the level of review of the at least one company's profile 106; and generate an electronic lead generation form 128 to include a key 130 indicative of the type of lead based on the level of review of the company's profile 106 or the receipt of at least one individual's contact information 132, e.g. for follow up.

Searchable code index 116 may be an acronym or the shortened form of the company's name 120. In some instances the shortened form may not be available e.g. because of a prior registrant and as such the searchable code index 116 may be derived by a computer random generator algorithm executable by the search index module 108 to create a unique searchable code index 116 for the participating company 122. In some embodiments, the search code index 116 may be supplied by the company, e.g. at registration.

FIGS. 2A-2D show a system 200 in accordance with one embodiment. The processor 112 is configured for activating the search index module 108 to receive the at least one company's registration information 114 to be displayed as a searchable code index 116 on at least one third-party search engine 124; convert a name 120 of the at least one company 122 to the searchable code index 116; determine at least one of one or more eligibility conditions for registerability of the at least one company 122 by the search index module 108 and/or the at least one processor 112; interface with at least one third-party search engine 124 to receive the at least one third party's search engine's request and simultaneously search the index code database 104 of registered participating companies profiles 106, 106' using the third-party search engine's search request to retrieve electronically, results comprising of one or a plurality of companies 122, 122 previously registered with the index code database 104 identifiable as being responsive to the third-party search engine's search request; and display simultaneously the results of the index code database search as an index listing 118 comprising of at least one or more searchable code indexes 116, 116' based on the prior registration information 114 and/or company profiles 106, 106' obtained from companies 122, 122' previously registered with the index code database 104.

The index listing 118 is displayed simultaneously with the third-party engine's search results 202, 202'. In some embodiments, the index listing 118 is displayed as a plurality of columns 204, 204', to the right or to the left of the third-party engine's search results 202, 202'. In other embodiments, the index listing 118 is displayed as a row 206 (not shown) at the top or bottom of the third-party engine's search results 202, 202'.

As shown in FIG. 2A, an exemplary third-party search engine's search request for "JOBS" returned third-party engine's search results 202, 202' as displayed. In conjunction with the third-party engine's search results 202, 202' are columns 204, 204', of the index listing 118 representative of the index database 104 search results using the third-party search engine's search request. The index listing 118 comprises of searchable code indexes 116, 116' of previously registered companies 122, 122', searchable via clickable search icons 126, 126' that are responsive to the third party search engine's search request. In some embodiments, the index listing 118 is published in graphics and/or audio.

In this manner, both individual job seekers and companies 122, 122' can target their search results such that job seekers are now made aware from the display of the third-party engine's search results 202, 202' of companies 122, 122' listed in the index listing 118 that are responsive to the search and have a stronger likelihood of having potential jobs for the individual job seeker as the third-party engine's search results 202, 202' and the searchable code indexes 116, 116' of previously registered company profiles 106, 106' are synchronized such that only searchable code indexes 116, 116' that have potential fruitful results, e.g. responsive to the search request for "JOBS", will be displayed in the index listing 118 based on the keyword search as entered ("JOBS") on the third party search engine 124.

If an individual, e.g. a potential purchaser, investor, employee or otherwise has an interest in for example a follow up call after reviewing the company's profile 106, the individual may request a call by completing an online lead generation form 128 as shown in FIG. 2D. The computer executable instruction code 110 of the search index module 108 and/or the processor 112 are operative to determine the level of review of the at least one company's profile 106; and generate an electronic lead generation form 128 to include a key 130 indicative of the type of lead based on the level of review of the company's profile 106 or the individual's contact information 132. The server index module 108 is configured to publish the lead generation form 128 to the corresponding company whose profile was reviewed. Accordingly, companies 122, 122' now have a clearer assessment of the level of interest of the candidates requesting follow up based on the key 130 generated on the lead generation form 128, which readily provides an immediate visual indicator as to the type of lead depending on the level of review of the company's profile 106 and/or verifiable individual contact information 132.

It is understood that the index listing 118 is created using all registered company profiles 106, 106' that have qualified for registerability with the system 100 and method. Participating companies 122, 122' may register by completing an online electronic form providing for the electronic receipt by the server index module 108 or the processor 112 of the company's registration information 114 and/or a more extensive company's profile 106 as shown in FIGS. 2B & 2C. Company registration information 114 may also be provided to the server 102 through any other means, including, but not limited to, digital delivery or computer readable medium delivery.

The processor 112 and/or the server index module 108 may include computer executable instruction code 110 configured to determine at least one eligibility condition for registerability of the at least one company 122, which may include verifiable company registration, e.g. company name 120, ratings from third-party business verification sites, e.g. Dunn & Bradstreet, Better Business Bureau and the like, verifiable internet protocol address, verifiable URLs and the like. Computer executable instruction code 110 may also be configured to display the registered company's searchable code index 116 on the index listing 118; review company company's registration information 114 for meeting eligibility criteria for registerability; determine company's registerability status; notify company 122 of registerability status as well as notify company 122 of an individual's request for follow up and the like.

Once the company 122 is registered on the index listing 118, it is available for review and optimized searching. In some embodiments, the system 100 and method disclosed herein may be activated for searching and lead generation by launching an application 206 (not shown), e.g., which may be accessible as an embedded link in results shown for the at least one third-party search engine 124 or via a downloadable application. In either embodiment, an individual may launch the application 206 (not shown) and click on the clickable search icon 126 and/or the corresponding searchable code index 116 to review the company's profile 106 as registered and may request additional information or a willing assent for a follow up call by providing his/her individual contact information as shown in FIG. 2D. Referring back to FIG. 2A, the clickable search icon 126 includes a magnifying glass shaped search icon 126, which allows an individual to initiate the search and obtain search results based on the company's profile information 106 as designated by the adjacent searchable code index 116. In some embodiments, no clickable search icon 126 is displayed, but rather a review of the company's profile 106 is available by clicking the searchable code index 116 itself.

In either embodiment, the search index module 108 has computer executable instruction code 110 configured to track variables determinative of the type of lead based on the level of the review and/or identity of verifiable individual contact information 132. Variables being tracked include but are not limited to: the length of time expended in reviewing the company's profile 106 during a review session, number of additional related searches based on keywords within the company's profile, number of keystrokes within any given review session to determine whether the search is active or latent because of session time out or computer sleep mode. As shown in FIG. 2D, in some embodiments, the type of lead is determined solely on verification of the individual's contact information 132, e.g. the President of the United States, or a President of a multi-national corporation, wherein the computer executable instruction code 110 authenticates the individual's contact information 132. In that event, when the President requests a follow up call by completing an electronic lead generation form 128, the key 130 is indicative of a hot lead even if the other measured variables indicate a minimal level of review. In some embodiments, the key 130 may include a plus sign to indicate a hot lead a minus sign to indicate a cold lead and a wavy symbol for warm lead. It is understood that the key 130 may comprise of any visual indicator that is well known and used in the arts.

Methods

Figure 3:
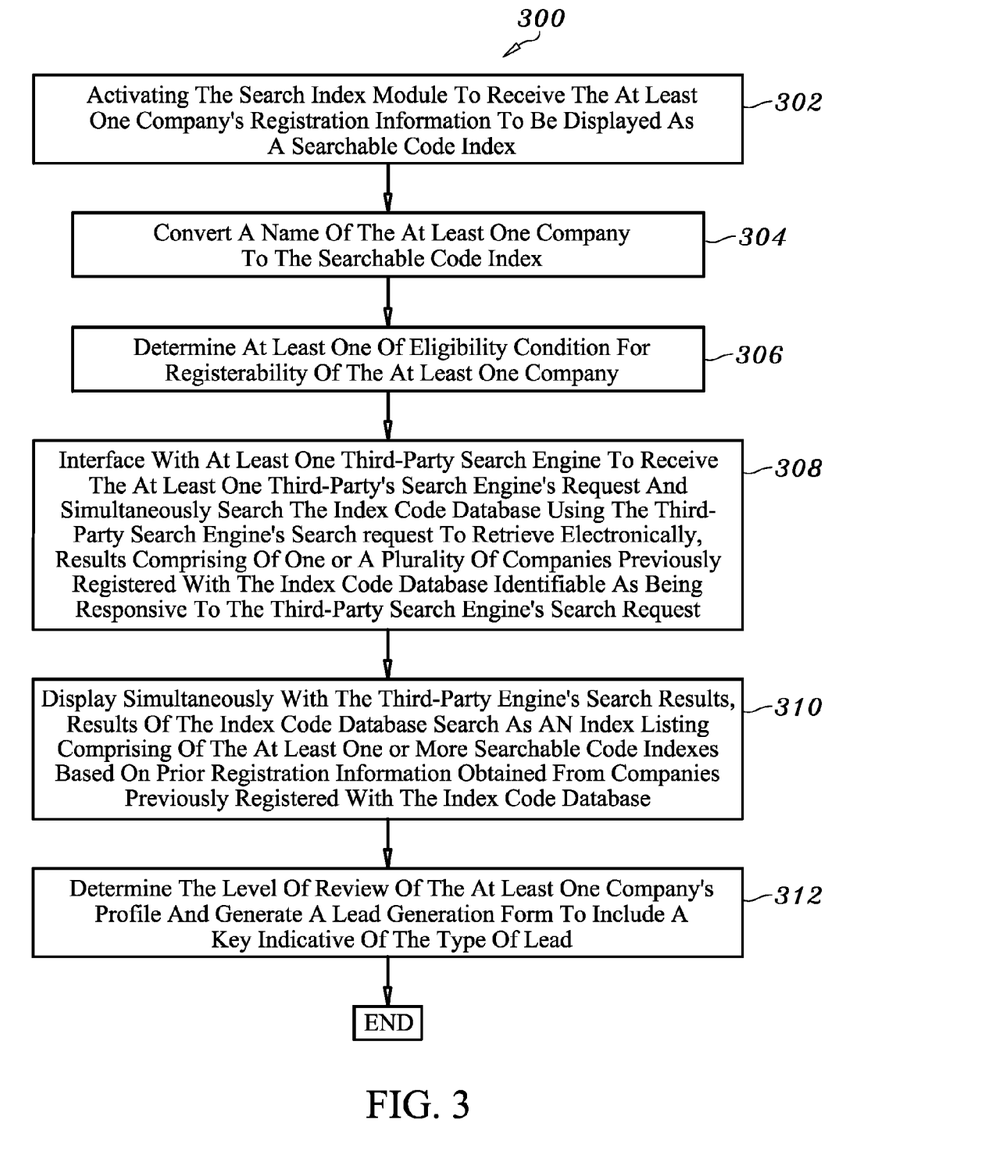
FIG. 3 describes a method according to an embodiment of the invention.

FIG. 3, shows a block diagram depicting a method 300 for conducting searches and lead generation comprising using at least one processor 112 with computer executable instruction code 110 stored thereon and configured to perform any or all of the following: activate the search index module 108 as previously described herein to receive the at least one company's registration information 114 to be displayed as a searchable code index 116 (step 302).

As previously discussed, system 100 includes at least one processor 112 in electronic communication with the at least one server 102. Processor 112 may be any type of processor, such as, but not limited to, a central processing unit (CPU), a microprocessor, a video processor, a front end processor, a coprocessor, a single-core processor, a multi-core processor, and the like. Processor 120 includes computer executable instruction code 110, where the computer executable instruction codes 112 are operative to perform all the necessary functions for the system 100 and methods disclosed herein. Computer executable instruction code 110 may be loaded directly on the server's processor 120, or its storage means 134 such as, but not limited to, computer readable media, such as, but not limited to, a hard drive, a solid state drive, a flash memory, random access memory, CD-ROM, CD-R, CD-RW, DVD-ROM, DVD-R, DVD-RW, and the like. The computer executable instruction code 110 may be any type of computer executable instruction code 110, which may be in the form of a computer program, the program being composed in any suitable programming language or source code, such as C++, C, JAVA, JavaScript, HTML, XML, and other programming languages.

Method 300 further comprises the computer executable instructions 110 configured to convert a name 120 of the least one company 122 to a unique searchable code index 116 (step 304). The searchable code index 116 may be derived from an acronym of the company's name 120, a suggested searchable code index 116 as provided by the company 122 or a random generating module that converts a company name 120 to a unique, computer generated searchable code index 116.

Method 300 further comprises the computer executable instruction code 110 configured to determine at least one of eligibility condition for registerability of the at least one company (step 306), which may include e.g. third-party business rating, e.g. Dunn & Bradstreet, Better Business Bureau and the like; verifiable corporate registration and age of company, verifiable internet protocol address, and verifiable company URLs and the like. In some embodiments, depending on the company 122 meeting certain eligibility requirements that are verified, e.g. verifiable company name 120, e.g. Microsoft, the other eligibility requirements may not apply.

Method 300 further comprises the computer executable instruction code 110 configured to interface with at least one third-party search engine 124 to receive the at least one third party's search engine's request and simultaneously search the index code database 104 of registered participating companies profiles 106, 106' using the third-party search engine's search request to retrieve electronically, results comprising of one or a plurality of companies 122, 122 previously registered with the index code database 104 identifiable as being responsive to the third-party search engine's search request (step 308). For example an individual initiates a search request on a third-party search engine 124 for "JOBS" and because of the interfacing, the index listing 118 is displayed as part of the search results, which will allow the individual to review the company's profile 106 in more depth. In this manner, both individual job seekers and companies 122, 122' can target their search results such that the job seekers are now made aware contemporaneous with the third-party results of companies 122, 122' listed in the index listing 118 that are responsive to the search request and may have a higher potential for available jobs as the third-party search engine search request and the index database search of company profiles 106, 106' are synchronized such that only searchable code indexes 116, 116' that have potential fruitful results, e.g. jobs, will be displayed in the index listing 118 based on the keyword search as entered ("JOBS").

Once the individual reviews the company's profile 106 the review is measured such that when the individual requests a follow up call by completing the lead generation form 128, the lead generation form includes a key 130 that provides an immediate assessment of the type of lead 128 based on the level of review. The server index module 108 is configured to publish the lead generation form 128 to the corresponding company whose profile was reviewed. Accordingly, companies 122, 122' now have a clearer assessment of the level of interest of the candidates requesting follow up based on the key 130 generated on the lead generation form 128, as the key 130 readily provides a visual as to the type of lead depending on the verifiable individual contact information 132 or the level of review of the company's profile 106.

Method 300 further comprises the computer executable instruction code 110 configured to display simultaneously the results of the index code database search as an index listing 118 comprising of at least one or more searchable code indexes 116, 116' based on the prior registration information 114 and/or company profiles 106, 106' obtained from companies 122, 122' previously registered with the index code database (step 310).

Method 300 further comprises the computer executable instruction code 110 configured to determine the level of review of the at least one company's profile 106 and generate a lead generation form 128 to include a key 130 indicative of the type of lead (step 312), i.e. hot, warm or cold lead. In some embodiments, the key 130 may include a plus sign to indicate a hot lead a minus sign to indicate a cold lead and a wavy symbol for warm lead. It is understood that the key 130 may comprise of any visual indicator that is well known and used in the arts.

In some embodiments, method 300 further comprises allowing or preventing the registration of a company 116 based on the selection criteria for registering with the index listing 118 and/or whether any aspect of the company's registration information 114 and/or profile 106 can be authenticated as. In this manner, fraudulent company registrations will be avoided.

In some embodiments, method 300 further comprises allowing or preventing the registration of an individual requesting a follow up contact from a company 116 based on whether the individual's electronic address can be authenticated as belonging to the individual. As such, frivolous requests can be denied access to the system 100 and method 300.

In yet a further embodiment, method 300 may comprise collecting a fee from the registration by a company 122 or by a user of the system 100 and method 300. In some embodiments, collecting a fee from an end user may be a prerequisite to allowing the content to be published in visual, audio, graphic, video or any other format.

Hardware and Operating Environment

This section provides an overview of example hardware and the operating environments in conjunction with which embodiments of the inventive subject matter can be implemented.

A software program may be launched from a computer readable medium in a computer-based system 400 to execute the functions defined in the software program. Various programming languages may be employed to create software programs designed to implement and perform the method 300 disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 4 below.

Figure 4:
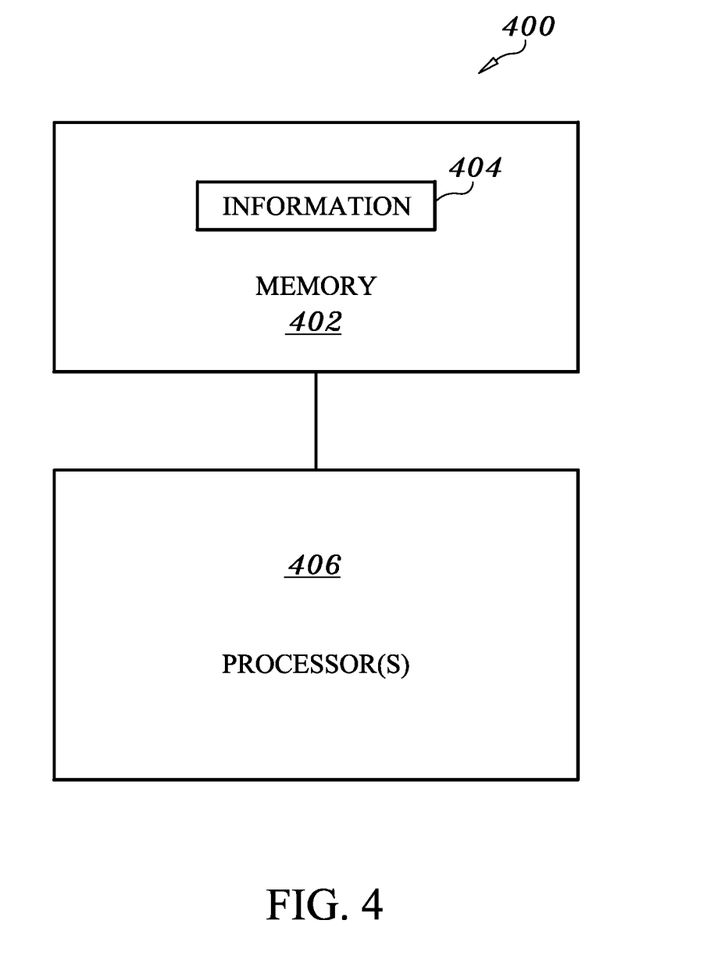
FIG. 4 is a block diagram representing an article according to various embodiments.

FIG. 4 is a block diagram representing an apparatus 400 according to various embodiments. Such embodiments may comprise a computer, a memory system, a magnetic or optical disk, some other storage device, or any type of electronic device or system. The apparatus 400 may include one or more processor(s) 404 coupled to a machine-accessible medium such as a memory 402 (e.g., a memory including electrical, optical, or electromagnetic elements). The medium may contain associated information 406 (e.g., computer program instructions, data, or both) which, when accessed, results in a machine (e.g., the processor(s) 404) performing the activities previously described herein.

The principles of the present disclosure may be applied to all types of computers, systems, and the like, include desktop computers, servers, notebook computers, personal digital assistants, microcomputers, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Accordingly, while the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A system for conducting searches and lead generation comprising of:
   at least one server:
   an index code database in electronic communication with the at least one server;
   a search index module comprising computer executable instruction code executable by at least one processor; and
   the at least one processor comprising computer executable instruction code operative to perform any one or more of the following:
      activate the search index module to receive from at least one company, the at least one company's registration information comprising at least the company's name stored on the system's index code database to be displayed as an unique searchable code index on an index listing, wherein the search index module converts the company's name to a unique searchable code index and authenticate company's registration information;
      interface with at least one third-party search engine to receive the at least one third party's search engine's request and simultaneously search the index code database using the third-party search engine's search request to retrieve electronically, search results comprising of one or a plurality of companies previously registered with the index code database identifiable as being responsive to the third-party search engine's search request;
      display simultaneously with the third-party engine's search results, the search results of the index code database search as a discrete index listing comprising of the at least one or more unique searchable code indexes based on prior registration information obtained from companies previously registered with the index code database for which the customer selects which search result to review without an invitation from the company, and also select whether a request for follow up information will be made to the at least one registered company whose profile was reviewed;
      receive a customer initiated permission based request for follow up information for the at least one registered company whose profile was reviewed based on a search from the searchable code index and generating a blank lead generation form, responsive to customer's permission based request, to automatically include a key indicative of the type of lead based on a determined level of review of the at least one registered company's profile for user input of user's contact information; and
      forward the completed lead generation form that includes the key to the at least one company whose profile was reviewed.

2. The system of claim 1, wherein the computer executable instructions are further operative to determine at least one eligibility condition for registerability of the at least one company.

3. The system of claim 1, wherein the computer executable instructions are further operative to retrieve the at least one company profile from the electronic index code database for display as a searchable code index.

4. The system of claim 1, wherein the computer executable instructions are further operative to transmit the completed lead generation form with the key indicative of the type of lead to the server.

5. The system of claim 1, wherein the computer executable instructions executable by the at least one processor are further operative to perform any one or more of the following:
   determine the length of time spent reviewing the company's profile during a review session;
   determine the number of additional related searches based on keywords within the company's profile; or
   determine the number of key strokes during a review session.

6. The system of claim 1, wherein the unique searchable code index comprises of any one or more of the following: company's initials, company designated searchable code index, or a random code generated searchable code index.

7. The system of claim 1, wherein the at least one eligibility condition is selected from the group consisting of: third-party business rating; verifiable corporate registration and age of company, verifiable internet protocol address, and verifiable company URLs.

8. The system of claim 1, wherein the level of review is based on any one or more of the following: time spent reviewing company's profile, number of additional related searches, and number of key strokes during review session.

9. The system of claim 1, wherein the key is indicative of any one of the following leads: hot, warm or cold.

10. The system of claim 1, wherein the computer executable instructions are further operative to perform any one or more of the following:
    allow or refuse registration of the at least one company based on whether authorization is received from the server; or
    publish the lead generation form to the corresponding company whose profile was reviewed.

11. The system of claim 1, wherein the index listing is displayed simultaneously with third party search results as either a column or a row.

12. The system of claim 1, further comprising receiving a request for review of the at least one company profile corresponding to an adjacent clickable search icon or the at least one searchable code index from the index listing displayed with the third-party search results.

13. The system of claim 12, wherein the search icon includes a magnifying glass shaped search icon.

14. The system of claim 1, wherein the key may include any one of the following: a plus sign, a minus sign or a wavy symbol.

15. A method for conducting searches and lead generation comprising using at least one processor with computer executable instruction code configured to perform any or all of the following:
    activate a search index module to receive from at least one company, the at least one company's registration information comprising at least the company's name stored on the system's index code database to be displayed as an unique searchable code index on an index listing, wherein the search index module converts the company's name to a unique searchable code index and authenticate company's registration information;
    interface with at least one third-party search engine to receive the at least one third party's search engine's request and simultaneously search the index code database using the third-party search engine's search request to retrieve electronically, search results comprising of one or a plurality of companies previously registered with the index code database identifiable as being responsive to the third-party search engine's search request;

display simultaneously with the third-party engine's search results, the results of the index code database search as a discrete index listing comprising of the at least one or more unique searchable code indexes based on prior registration information obtained from companies previously registered with the index code database for which the customer selects which search result to review without an invitation from the company, and also select whether a request for follow up information will be made to the at least one registered company whose profile was reviewed; and receive a customer initiated permission based request for follow up information for the at least one registered company whose profile was reviewed and generating a blank lead generation form, responsive to customer's permission based request, to automatically include a key indicative of the type of lead based on a determined level of review of the at least one registered company's profile-for user input of user's contact information; and forward the completed lead generation form that includes the key to the at least one company whose profile was reviewed.

16. The method of claim 15, wherein the computer executable instructions are further operative to allow or refuse company's registration based on the at least one of the eligibility conditions.

17. The method of claim 15, wherein the computer executable instructions are further operative to retrieve the at least one company profile from the electronic index code database for display as a searchable code index.

18. The method of claim 15, wherein the computer executable instructions are further operative to transmit the completed lead generation form with the key indicative of the level of review to the server.

19. The method of claim 15, wherein the computer executable instructions are further operative to perform any one or more of the following:

determine the length of time spent reviewing the company's profile during a review session;

determine the number of additional related searches based on keywords within the company's profile; or determine the number of key strokes during a review session.

20. The method of claim 15, wherein the unique searchable code index comprises of any one or more of the following: company's initials, company designated searchable code index, or a random code generated searchable code index.

21. The method of claim 15, wherein the at least one eligibility condition is selected from the group consisting of: third-party rating; verifiable corporate registration and age of company.

22. The method of claim 15, wherein the level of review is based on any one or more of the following: time spent reviewing company's profile, number of additional related searches, and number of key strokes during review session.

23. The method of claim 15, wherein the key is indicative of any one of the following: hot lead, warm lead or cold lead.

24. The method of claim 15, wherein the computer executable instructions are further operative to perform any one or more of the following:

allow or refuse registration of the at least one company based on whether authorization is received from the server; or publish the lead generation form to the corresponding company whose profile was reviewed.

25. The method of claim 15, wherein the index listing is displayed simultaneously with third party search results as either a column or a row.

26. The method of claim 15, further comprising the step of receiving a request for review of the at least one company profile corresponding to an adjacent clickable search icon or the at least one searchable code index from the index listing displayed with the third-party search results.

27. The method of claim 26, wherein the search icon includes a magnifying glass shaped search icon.

28. The method of claim 15, wherein the key may include any one of the following: a plus sign, a minus sign or a wavy symbol.

* * * * *